US008752205B2

(12) United States Patent
Jung et al.

(10) Patent No.: US 8,752,205 B2
(45) Date of Patent: Jun. 10, 2014

(54) APPARATUS AND METHOD FOR MANAGING DIGITAL RIGHTS MANAGEMENT CONTENTS IN PORTABLE TERMINAL

(75) Inventors: Chan-Ho Jung, Seoul (KR); Dong-Eup Ham, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1231 days.

(21) Appl. No.: 12/036,428

(22) Filed: Feb. 25, 2008

(65) Prior Publication Data

US 2009/0007222 A1 Jan. 1, 2009

(30) Foreign Application Priority Data

Feb. 23, 2007 (KR) ........................ 10-2007-0018238

(51) Int. Cl.
*G06F 17/00* (2006.01)
*H04L 29/06* (2006.01)
*G06F 7/04* (2006.01)
*G06F 17/30* (2006.01)
*H04N 7/16* (2011.01)

(52) U.S. Cl.
USPC ................................... 726/29; 726/1; 726/26

(58) Field of Classification Search
USPC ................................................. 726/1, 26, 29
See application file for complete search history.

(56) References Cited

U.S. PATENT DOCUMENTS

| 8,095,517 B2* | 1/2012 | Sandoval et al. | 707/695 |
| 8,180,936 B2* | 5/2012 | Jeong et al. | 710/33 |
| 8,301,785 B2* | 10/2012 | Jeong et al. | 709/228 |
| 2003/0191942 A1* | 10/2003 | Sinha et al. | 713/181 |
| 2005/0021556 A1* | 1/2005 | Noguchi et al. | 707/102 |
| 2005/0091507 A1* | 4/2005 | Lee et al. | 713/182 |
| 2007/0094145 A1* | 4/2007 | Ta et al. | 705/59 |
| 2007/0198419 A1* | 8/2007 | Park et al. | 705/52 |
| 2007/0204078 A1* | 8/2007 | Boccon-Gibod et al. | 710/54 |
| 2007/0288715 A1* | 12/2007 | Boswell et al. | 711/164 |
| 2008/0148414 A1* | 6/2008 | Tom | 726/29 |
| 2009/0012805 A1* | 1/2009 | Schnell et al. | 705/1 |
| 2010/0031366 A1* | 2/2010 | Knight et al. | 726/26 |

FOREIGN PATENT DOCUMENTS

| EP | 1 197 826 | 4/2002 |
| KR | 1020050062829 | 6/2005 |
| KR | 100650052 | 11/2006 |
| WO | WO 01/33317 | 5/2001 |

OTHER PUBLICATIONS

Open Mobile Alliance: "OMA Secure Removable Media Specification", Draft Version 1.0, Feb. 2, 2007.
Open Mobile Alliance: "DRM Specification", Approved Version 2.0, Jan. 26, 2007.
Windows Media, "Guidelines for Supporting Multiple Storage Locations on a Portable Device", Microsoft Corporation, Jun. 2005.

* cited by examiner

*Primary Examiner* — Kambiz Zand
*Assistant Examiner* — Benjamin Kaplan
(74) *Attorney, Agent, or Firm* — The Farrell Law Firm, P.C.

(57) ABSTRACT

Provided is an apparatus and method for managing Digital Rights Management (DRM) contents in a portable terminal. The method includes when a license of the DRM content is consumed, changing license information, which is stored in an external memory, on the DRM content; storing information relating to changed data of the external memory into an internal memory; determining whether the changed license information stored in the external memory has changed by using the information stored in the internal memory when the DRM content is used; and determining whether the DRM content is available according to whether the changed license information has changed.

16 Claims, 3 Drawing Sheets

APPARATUS AND METHOD FOR MANAGING DIGITAL RIGHTS MANAGEMENT CONTENTS IN PORTABLE TERMINAL

PRIORITY

This application claims priority under 35 U.S.C. §119 to an application filed in the Korean Intellectual Property Office on Feb. 23, 2007 and assigned Serial No. 2007-18238, the contents of which are incorporated herein by reference.

BACKGROUND OF THE INVENTION

1. Field of the Invention

The present invention relates generally to an apparatus and method for managing Digital Rights Management (DRM) contents in a portable terminal, and in particular, to an apparatus and method for preventing a replay attack on DRM contents.

2. Description of the Related Art

An internal memory of a portable terminal generally has a limited capacity of 32 MB or 64 MB. The internal memory is used for a built-in camera, Multimedia Message Services (MMSs), and various application programs, so that the internal memory stores still pictures, moving pictures, messages, metadata, and setting information used in the application programs. Thus, an available capacity of the internal memory has become very small.

Recently, the number of high-definition and large-capacity digital rights management (DRM) contents has increased according to users' demands. The DRM contents are encrypted contents for protecting rights and interests of digital content providers and thus a license or a right object is essential for decrypting and using the DRM contents. The license generally has a capacity of 5 to 20 KB and one DRM content may have up to one thousand licenses according to its type. Therefore, it is difficult to store a number of the DRM contents into the internal memory.

As a result, it has been recently recommended that an external memory of a portable terminal store a DRM DataBase (DB) having information on a license of a DRM content. However, when the external memory stores the DRM DB, a replay attack on usage-count and usage-time limited DRM contents is possible. For example, a DRM DB stored in an external memory is backed-up to another device, and a corresponding DRM content is used for a predetermined usage-count or usage-time, and then the backup DRM DB is again stored in the external memory. In this way, the DRM content can be continuously used regardless of the predetermined usage-count or usage-time.

SUMMARY OF THE INVENTION

The present invention solves at least the above problems and/or disadvantages and provides at least the advantages below. Accordingly, an object of the present invention is to provide an apparatus and method for managing Digital Rights Management (DRM) contents in a portable terminal.

The present invention provides an apparatus and method for preventing a replay attack on DRM contents in a portable terminal.

According to one aspect of the present invention, a method for managing a Digital Rights Management (DRM) content in a portable terminal includes when a license of the DRM content is consumed, changing license information, which is stored in an external memory, on the DRM content; storing information relating to changed data of the external memory into an internal memory; when the DRM content is used, determining whether the changed license information stored in the external memory is changed by using the information stored in the internal memory; and determining whether the DRM content is available according to whether the changed license information is changed.

According to another aspect of the present invention, an apparatus for managing a DRM content in a portable terminal includes an external memory for storing changed license information on the DRM content when a license of the DRM content is consumed; an internal memory for storing information relating to changed data of the external memory; and a DRM unit for, when the DRM content is used, determining whether the changed license information stored in the external memory is changed by using the information stored in the internal memory, and determining whether the DRM content is available according to whether the changed license information is changed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention to provides an apparatus and method for storing information on an external DRM DataBase (DB) stored in an external memory into an internal memory and managing the information, thereby preventing a replay attack on DRM contents. Here, the external DRM DB is a DB that stores information on licenses (hereinafter, "license information") of DRM contents stored in a portable terminal.

Figure 1:
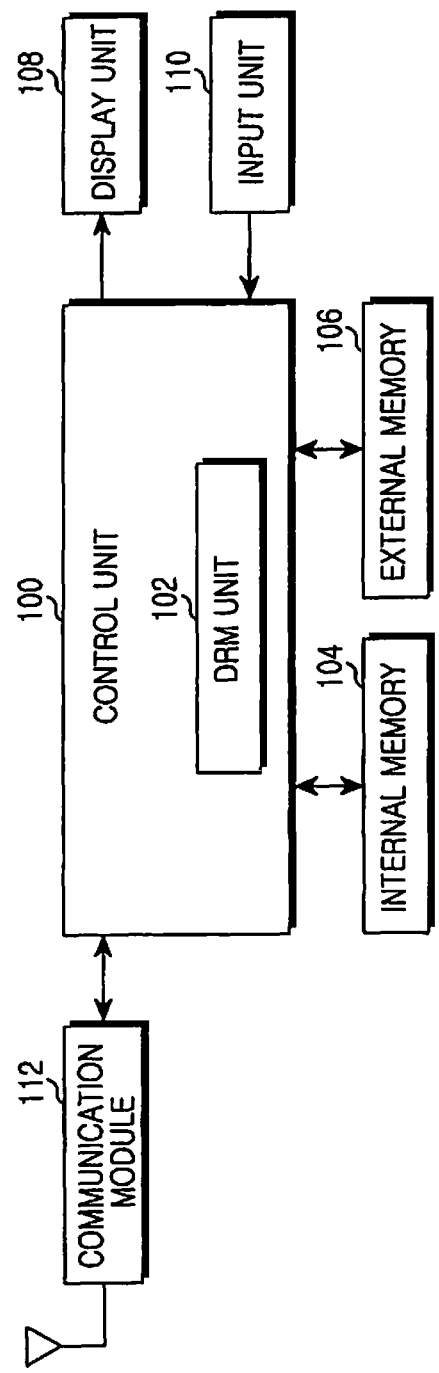
FIG. 1 is a block diagram of a portable terminal according to an embodiment of the present invention.

FIG. 1 is a block diagram of a portable terminal according to an embodiment of the present invention. The terminal includes a control unit 100, a DRM unit 102, an internal memory 104, an external memory 106, a display unit 108, an input unit 110, and a communication module 112.

Referring to FIG. 1, the control unit 100 controls an overall operation of the terminal. For example, the control unit 100 controls and processes functions for voice and data communications. Particularly, since the control unit 100 includes the DRM unit 102, when a license of a DRM content is consumed and the license's state information is changed, the control unit 100 controls and processes a function for changing previous state information stored in an external DRM DB of the external memory 106 into the changed state information. In addition, the control unit 100 controls and processes a function for storing, into the internal memory 104, information on the writing (hereinafter, "writing information") of the changed state information. For example, in a usage-count or usage-time limited DRM content, when an available usage-count or usage-time is changed, the changed usage-count or usage-time is written into the external memory 106, and information on the writing of the changed usage-count or usage-time is written into the internal memory 104. Here, the state information indicates information on a license of a DRM content.

When an event for using a DRM content occurs, the control unit 100 determines whether the DRM content is available by determining, based on writing information stored in the internal memory 104, whether the DRM content's state information stored in the external DRM DB of the external memory 106 has been changed. Specifically, the control unit 100 stores writing information relating to the latest changed state information into the internal memory 104. Using the writing information stored in the internal memory 104, the control unit 100 determines whether current state information stored in the external memory 106 is illegally changed. The control unit 100 prevents using a corresponding DRM content when the changed state information is illegally changed.

The internal memory 104 is installed in the terminal to store still pictures, moving pictures, messages, and metadata and setting information used in various application programs stored in the terminal. In addition, the internal memory 104 includes an internal DRM DB according to the present invention, so that the internal memory 104 stores changed state information on a DRM content. The internal DRM DB stores an IDentification (ID) value, a start position, a data length, and a hash value (i.e., writing information). Here, the ID value indicates an ID of a corresponding DRM content, the start position is a position in the external DRM DB of the external memory 106 from which writing of the changed state information (i.e., changed license information on the DRM content) starts, the data length indicates a length of the changed state information to be written, and the hash value means Secure Hash Algorithm-1 (SHA1) or Message Digest algorithm 5 (MD5) hash value of the changed state information.

The external memory 106 is a memory that is installable and detachable to and from the terminal, and includes an external DRM DB for storing state information on a DRM content. Particularly, an external DRM DB stored in the external memory 106 according to the present invention also includes Unique IDentity (UID) fields and ID fields corresponding to each DRM content. The UID field contains a unique ID code indicating that state information on a DRM content is changed, and the ID field contains an ID code of a DRM content.

The display unit 108 displays state information generated during operations of the terminal. The control unit 100 controls the display unit 108 to display a message indicating that a DRM content is unavailable. The input unit 110 includes a plurality of numeral keys, letter keys, and function keys. When any one of key of these keys is pressed by a user, the input unit 110 sends a corresponding key signal to the control unit 100. The communication module 112 processes signals transmitted/received through an antenna.

Figure 2:
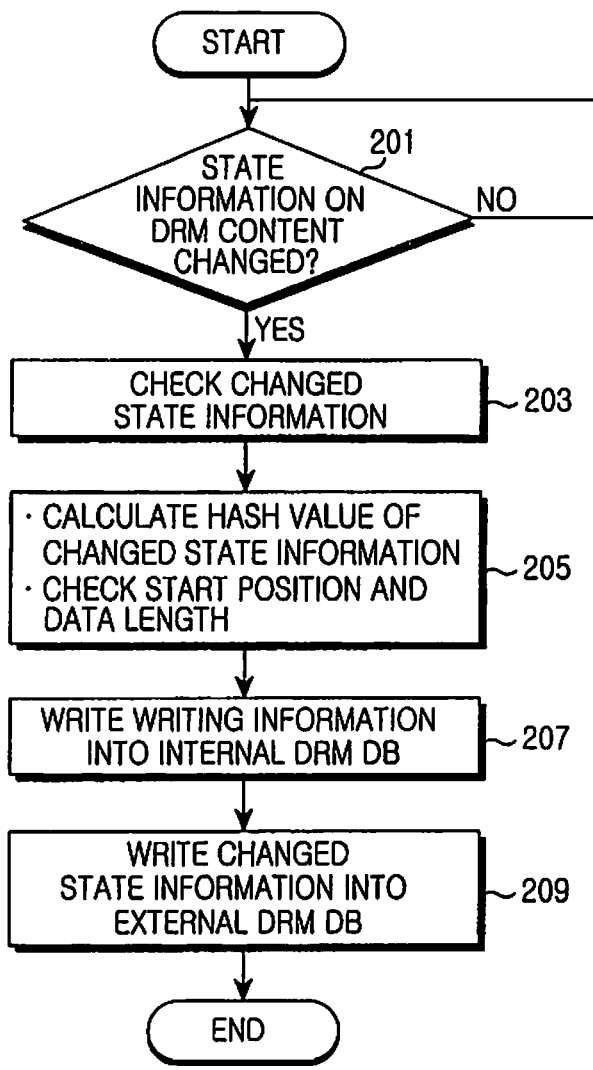
FIG. 2 is a flowchart illustrating a procedure for writing changed state information on a DRM content into an internal memory of a portable terminal according to an embodiment of the present invention.

FIG. 2 is a flowchart illustrating a procedure for writing changed state information on a DRM content into an internal memory in a portable terminal according to an embodiment of the present invention.

Referring to FIG. 2, in step 201, the terminal determines whether state information on a DRM content has been changed due to a consumption of a license of the DRM content. When the state information has been changed, in step 203, the terminal checks the changed state information to be written into an external DRM DB of the external memory 106. For example, in a usage-count limited DRM content, a decreased usage-count is checked in order to be written into the external DRM DB of the external memory 106.

In step 205, the terminal calculates a hash value of the changed state information, checks information on a start position in the external memory 106 from which writing of the changed state information starts, and checks a data length of the changed state information. In step 207, the terminal writes the checked information into an internal DRM DB of the internal memory 104. In step 209, the terminal writes the changed state information into the external DRM DB of the external memory 106. Thereafter, the terminal ends the procedure.

Figure 3:
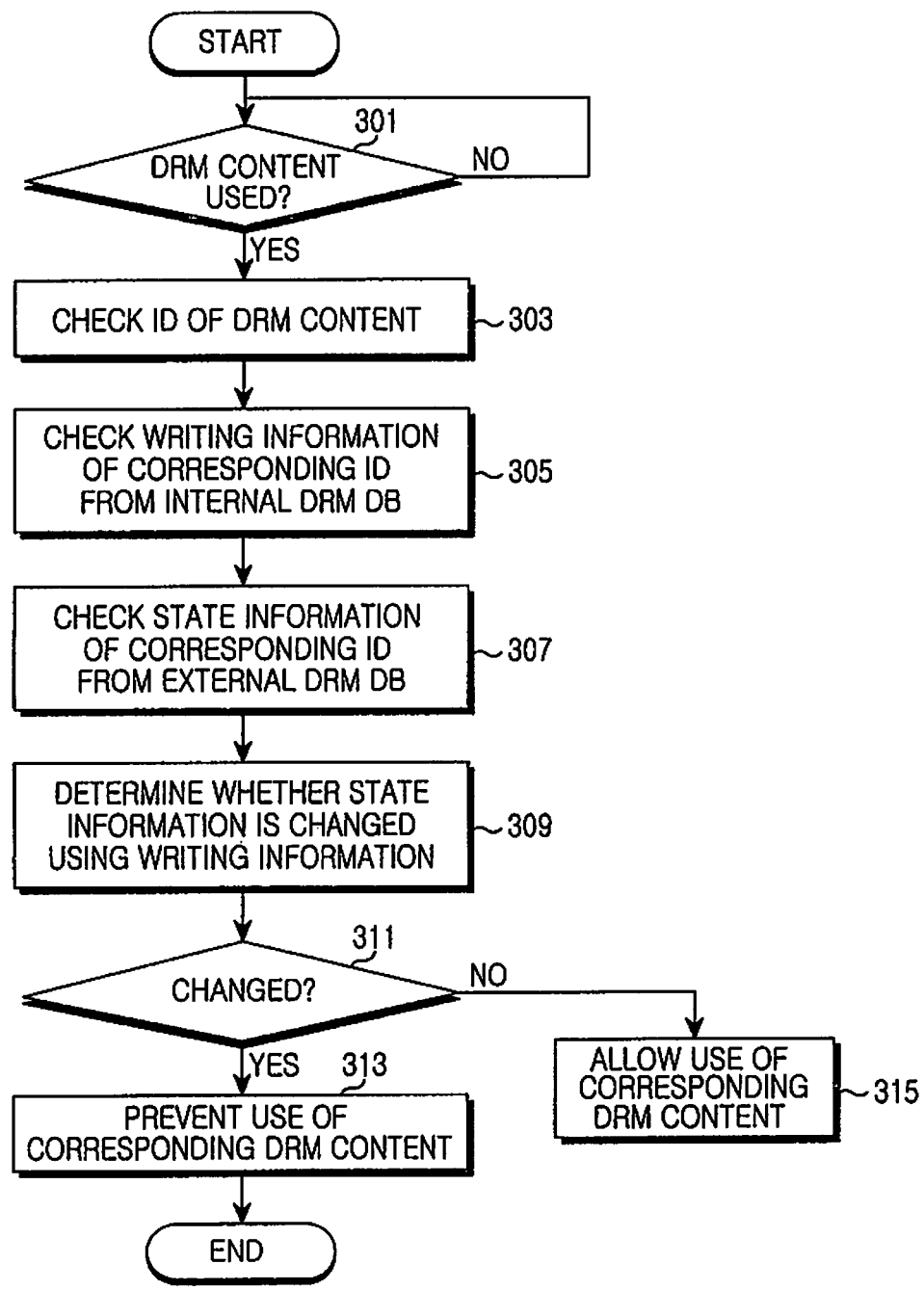
FIG. 3 is a flowchart illustrating a procedure for replaying a DRM content in a portable terminal according to an embodiment of the present invention.

FIG. 3 is a flowchart illustrating a procedure for replaying a DRM content in a portable terminal according to an embodiment of the present invention.

Referring to FIG. 3, in step 301, the terminal determines whether a DRM content replay event occurs. In step 303, the terminal checks an ID code of a corresponding DRM content. In step 305, the terminal checks writing information corresponding to the ID code from the internal DRM DB of the internal memory 104. In step 307, the terminal checks state information (i.e., license information) on the DRM content having the ID code from the external DRM DB of the external memory 106.

In step 309, the terminal determines whether the state information on the DRM content has been changed using the checked writing information. Specifically, by using the start position and the data length from among the writing information, the terminal searches a position in the external DRM DB of the external memory 106 at which the state information should be written. Then, using a hash value from among the checked writing information, the terminal determines whether the state information is changed.

If the state information has been changed in step 311, the terminal controls the DRM content to be unavailable and informs a user that the DRM is unavailable, in step 313. On the other hand, if the state information has not been changed in step 311, the terminal allows the user to use the DRM content, in step 315. Thereafter, the terminal ends the procedure.

In the embodiment of the present invention, writing information is written into the internal memory 104 before state information is written into the external memory 106. Alternatively, the writing information may be written into the internal memory 104 after the state information is written into the external memory 106.

Alternate embodiments of the present invention can also comprise computer readable codes on a computer readable medium. The computer readable medium includes any data storage device that can store data that can be read by a computer system. Examples of a computer readable medium include magnetic storage media (such as Read-Only Memory (ROM), floppy disks, and hard disks, among others), optical recording media (such as Compact Disc (CD)-ROMs or Digital Versatile Discs (DVDs)), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

As described above, the present invention stores information of an external DRM DB stored in an external memory into an internal memory and manages the information. When the information of the external DRM DB is different from the information stored in the internal memory, a use of a corresponding DRM content is prohibited, thereby preventing a continuous use of the DRM content due to the change of the external DRM DB. In addition, instead of a hash value of the external DRM DB, a hash value of a changed region is used, so that a performance deterioration of the terminal is prevented.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for managing a Digital Rights Management (DRM) content in a portable terminal, the method comprising:
   when a license of the DRM content is consumed, writing changed license information, which is stored in an external memory, on the DRM content;
   storing information representing a written state of the changed license information of the external memory into an internal memory;
   when a replay of the DRM content is attempted, checking latest license information from the external memory using the information stored in the internal memory;
   determining whether the changed license information has changed by comparing a hash value from among the information stored in the internal memory with a hash value from the checked latest license information; and
   determining whether the DRM content is available according to whether the changed license information has changed.

2. The method of claim 1, wherein the information representing the written state comprises at least one of an IDentification (ID) code of the DRM content, a start position of the changed license information in the external memory, a data length of the changed license information, and a hash value of the changed license information.

3. The method of claim 1, wherein determining whether the changed license information has changed comprises:
   checking the latest license information from the external memory using a start position and a data length from among the information stored in the internal memory.

4. The method of claim 1, wherein determining whether the DRM content is available comprises, when the changed license information stored in the external memory has changed, preventing a use of the DRM content.

5. The method of claim 1, wherein determining whether the DRM content is available comprises, when the changed license information has not changed, allowing a use of the DRM content.

6. An apparatus for managing a Digital Rights Management (DRM) content in a portable terminal, the apparatus comprising:
   an external memory configured to write changed license information on the DRM content when a license of the DRM content is consumed;
   an internal memory configured to store information representing a written state of the changed license information of the external memory; and
   a DRM unit configured to check latest license information from the external memory using the information stored in the internal memory and to determine whether the changed license information has changed by comparing, a hash value from among the information stored in the internal memory with a hash value from the checked latest license information, when a replay of the DRM content is attempted, and to determine whether the DRM content is available according to whether the changed license information has changed.

7. The apparatus of claim 6, wherein the information representing the written state comprises at least one of an IDentification (ID) code of the DRM content, a start position of the changed license information in the external memory, a data length of the changed license information, and a hash value of the changed license information.

8. The apparatus of claim 6, wherein, when the changed license information stored in the external memory has changed, the DRM unit prevents a use of the DRM content, and, when the changed license information has not changed, allows a use of the DRM content.

9. A method for managing a Digital Rights Management (DRM) content in a portable terminal, the method comprising:
   when a license of the DRM content is consumed, writing changed license information, which is stored in an external memory, on the DRM content;
   storing information representing a written state of the changed license information of the external memory into an internal memory;
   when a replay of the DRM content is attempted, checking latest license information from the external memory using a start position from among the information stored in the internal memory;
   determining whether the changed license information has changed by comparing a hash value from among the information stored in the internal memory with a hash value from the checked latest license information; and
   determining whether the DRM content is available according to whether the changed license information has changed.

10. The method of claim 9, wherein determining whether the changed license information stored in the external memory has changed comprises:
    checking the latest license information from the external memory using the start position and a data length from among the information stored in the internal memory.

11. The method of claim 9, wherein determining whether the DRM content is available comprises, when the changed license information stored in the external memory has changed, preventing a use of the DRM content.

12. The method of claim 9, wherein determining whether the DRM content is available comprises, when the changed license information stored in the external memory has not changed, allowing a use of the DRM content.

13. The method of claim 9, wherein the information representing the written state comprises at least one of an IDentification (ID) code of the DRM content, a start position of the changed license information in the external memory, a data length of the changed license information, and a hash value of the changed license information.

14. A portable terminal for managing a Digital Rights Management (DRM) content, the portable terminal comprising:
   an external memory configured to, when a license of the DRM content is consumed, write changed license information on the DRM content;
   an internal memory configured to store information representing a written state of the changed license information of the external memory; and
   a DRM unit configured to check latest license information from the external memory using a start position from among the information stored in the internal memory and to determine whether the changed license information has changed by comparing a hash value from among the information stored in the internal memory with a hash value from the checked latest license information, when a replay of the DRM content is attempted, and to determine whether the DRM content is available according to whether the changed license information has changed.

15. The portable terminal of claim 14, wherein the information representing the written state comprises at least one of an Identification (ID) code of the DRM content, a start position of the changed license information in the external memory, a data length of the changed license information, and a hash value of the changed license information.

16. A computer-readable recording medium having recorded thereon a program for managing a Digital Rights Management (DRM) content in a portable terminal, the program comprising:

a first code segment, configured to write changed information, which is stored in an external memory, on the DRM content, when a license of the DRM content is consumed;

a second code segment, configured to store information representing a written state of the changed license information of the external memory into an internal memory;

a third code segment, configured to check latest license information from the external memory using the information stored in the internal memory and to determine whether the changed license information has changed by comparing a hash value from among the information stored in the internal memory with a hash value from the checked latest license information; and a fourth code segment, configured to determine whether the DRM content is available according to whether the changed license information has changed.

* * * * *